United States Patent
Zuckerbraun et al.

(10) Patent No.: US 10,528,737 B2
(45) Date of Patent: Jan. 7, 2020

(54) RANDOMIZED HEAP ALLOCATION

(71) Applicant: Trend Micro Incorporated, Tokyo (JP)

(72) Inventors: Simon Zuckerbraun, Chicago, IL (US); Abdul Aziz Hariri, Montreal (CA); Brian Thomas Gorenc, Austin, TX (US)

(73) Assignee: Trend Micro Incorporated, Tokyo (JP)

( * ) Notice: Subject to any disclaimer, the term of this patent is extended or adjusted under 35 U.S.C. 154(b) by 230 days.

(21) Appl. No.: 15/834,588

(22) Filed: Dec. 7, 2017

(65) Prior Publication Data

US 2018/0101683 A1      Apr. 12, 2018

Related U.S. Application Data

(63) Continuation of application No. PCT/US2015/036318, filed on Jun. 18, 2015.

(51) Int. Cl.
| | |
|---|---|
| *H04L 29/06* | (2006.01) |
| *G06F 21/56* | (2013.01) |
| *G06F 16/22* | (2019.01) |
| *G06F 9/50* | (2006.01) |

(Continued)

(52) U.S. Cl.
CPC .............. *G06F 21/566* (2013.01); *G06F 9/50* (2013.01); *G06F 9/5016* (2013.01); *G06F 12/023* (2013.01); *G06F 16/2237* (2019.01); *G06F 21/54* (2013.01); *G06F 2212/1044* (2013.01); *G06F 2212/1052* (2013.01); *G06F 2221/034* (2013.01)

(58) Field of Classification Search
CPC .................................................. G06F 21/566
See application file for complete search history.

(56) References Cited

U.S. PATENT DOCUMENTS

| | | | | |
|---|---|---|---|---|
| 7,606,815 B1 * | 10/2009 | Kryger | ............ | G06F 16/13 |
| 2003/0187995 A1 * | 10/2003 | Fok | ........... | H04L 29/06 |
| | | | | 709/227 |
| 2003/0212719 A1 * | 11/2003 | Yasuda | ........... | G06F 12/0276 |

(Continued)

FOREIGN PATENT DOCUMENTS

| | | |
|---|---|---|
| KR | 10-1217546 B1 | 1/2013 |
| WO | 2012-148841 A1 | 11/2012 |

OTHER PUBLICATIONS

Hu, Jingtong, et al. "Data allocation optimization for hybrid scratch pad memory with SRAM and nonvolatile memory." IEEE Transactions on Very Large Scale Integration (VLSI) Systems 21.6 (2012): 1094-1102. (Year: 2012).*

(Continued)

*Primary Examiner* — Shawnchoy Rahman
(74) *Attorney, Agent, or Firm* — Okamoto & Benedicto LLP

(57) ABSTRACT

Examples relate to randomized heap allocation. One example enables creating a set of heaps for an application; allocating an array for the application, wherein the application comprises a set of object types, the array comprises a set of elements, and each element of the array is associated with a unique object type of the set of object types; and initializing the array by: iterating over the array to associate each element of the array with a randomly chosen heap of the set of heaps.

11 Claims, 2 Drawing Sheets

---

400 CREATE A SET OF HEAPS FOR AN APPLICATION

410 ALLOCATE AN ARRAY FOR THE APPLICATION

420 INITIALIZE THE ARRAY

(51) Int. Cl.
*G06F 21/54* (2013.01)
*G06F 12/02* (2006.01)

(56) References Cited

U.S. PATENT DOCUMENTS

2007/0136385 A1   6/2007  Abrashkevich et al.
2007/0234297 A1*  10/2007 Zorn .................. G06F 11/3612
                                                      717/124

OTHER PUBLICATIONS

Zhang, Jun, et al. "Optimizing data allocation for loops on embedded systems with scratch-pad memory." 2012 IEEE International Conference on Embedded and Real-Time Computing Systems and Applications. IEEE, 2012. (Year: 2012).*
Byoungyoung Lee, et al. "Preventing Use-after-free with Dangling Pointers Nullification", Feb. 7, 2015, 15 pages, NDSS Symposium.
Salman Javaid "Analysis and Detection of Heap-based Malwares Using Introspection in a Virtualized Environment", Aug. 13, 2014, 56 pages.
PCT International Preliminary Report on Patentability for Application No. PCT/US2015/036318, dated Dec. 19, 2017 (Dec. 19, 2017), 5 sheets.

* cited by examiner

RANDOMIZED HEAP ALLOCATION

CROSS-REFERENCE TO RELATED APPLICATION

This application is a continuation of International Application No. PCT/US2015/036318, with an International Filing Date of Jun. 18, 2015, which is incorporated herein by reference in its entirety.

BACKGROUND

Attackers may try to gain access to a computer system using a use after free ("UAF") attack. This attack overwrites memory of an object stored in memory that is freed in conjunction with the execution of an application. The attack overwrites the freed object with the allocation of another object that could be used to maliciously harm the system if executed.

BRIEF DESCRIPTION OF THE DRAWINGS

The following detailed description references the drawings, wherein.

DETAILED DESCRIPTION

Figure 1:
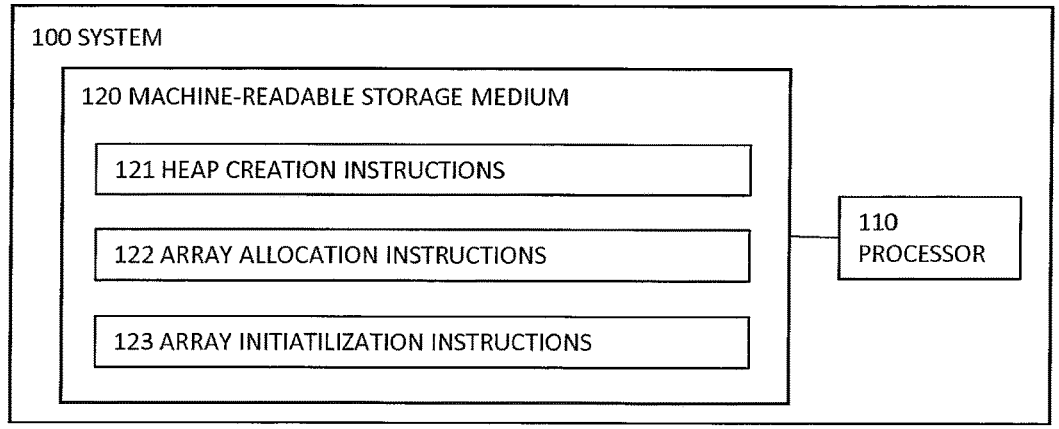
FIG. 1 is a block diagram of an example system for randomized heap allocation.

The following detailed description refers to the accompanying drawings. Wherever possible, the same reference numbers are used in the drawings and the following description to refer to the same or similar parts. While several examples are described in this document, modifications, adaptations, and other implementations are possible. Accordingly, the following detailed description does not limit the disclosed examples. Instead, the proper scope of the disclosed examples may be defined by the appended claims.

As mentioned above, attackers may try to gain access to a computer system using a use after free ("UAF") attack. This attack overwrites memory of an object stored in memory that is freed in conjunction with the execution of an application. The attack overwrites the freed object with the allocation of another object that could be used to maliciously harm the system if executed.

A successful attack often depends upon the ability of the attacker to choose the object types and size of a new allocation, such that the data written by the attacker will have the correct values and position to influence behavior of the application in the manner intended by the attacker.

To defend against these kinds of attacks, system and applications use heap partitioning, whereby the application creates a separate heap for each type of object used by the application. This solution can get cumbersome, inefficient, and even potentially impossible to implement because it results in a very large number of heaps with an unacceptable amount of overhead and complex heap management.

A new technical solution to this issue involves randomized heap allocation and partitioning. This solution minimizes the distinct number of heaps required to effectively combat UAF attacks. By randomizing the assignment of object types to heaps for an application at runtime, the solution may deny the attacker knowledge of which types of objects may be associated with any given heap. The attacker may also be unaware of the multiple types of objects that may coexist within any given heap.

A computer system implementing randomized heap allocation for an instance of an application may create a set of heaps for an application. The system may also allocate an array for the application, where the application comprise a set of object types and the array comprises a set of elements. The system may associate each element of the array with a unique object type of the set of object types. The system may also initialize the array by: iterating over the array to associate each element of the array with a randomly chosen heap of the set of heaps Referring now to the drawings, FIG. 1 is a block diagram of an example system 100 for randomized heap allocation. In the example depicted in FIG. 1, system 100 includes a non-transitory machine-readable storage medium 120 and a processor 110.

Referring now to the drawings, FIG. 1 is a block diagram of an example system 100 for randomized heap allocation. System 100 may comprise a cloud server, a mainframe, notebook, desktop, tablet, workstation, mobile device, and/or any other device suitable for executing the functionality described below. In the embodiment of FIG. 1, system 100 includes a non-transitory machine-readable storage medium 120 and a processor 110.

Processor 110 may be one or more central processing units (CPUs), microprocessors, and/or other hardware devices suitable for retrieval and execution of instructions stored in machine-readable storage medium 120. Processor 110 may fetch, decode, and execute program instructions 121, 122, 123, and/or other instructions to enable randomized heap allocation, as described below. As an alternative or in addition to retrieving and executing instructions, processor 110 may include one or more electronic circuits comprising a number of electronic components for performing the functionality of one or more of instructions 121, 122, 123, and/or other instructions.

In one example, the program instructions 121, 122, 123, and/or other instructions can be part of an installation package that can be executed by processor 110 to implement the functionality described herein. In this case, memory 120 may be a portable medium such as a CD, DVD, or flash drive or a memory maintained by a computing device from which the installation package can be downloaded and installed. In another example, the program instructions may be part of an application or applications already installed on system 100.

Non-transitory machine-readable storage medium 120 may be any hardware storage device for maintaining data accessible to system 100. For example, machine-readable storage medium 120 may include one or more hard disk drives, solid state drives, tape drives, and/or any other storage devices. The storage devices may be located in system 100 and/or in another device in communication with system 100. For example, machine-readable storage medium 120 may be any electronic, magnetic, optical, or other physical storage device that stores executable instructions. Thus, machine-readable storage medium 120 may be, for example, Random Access Memory (RAM), an Electrically-Erasable Programmable Read-Only Memory (EEPROM), a storage drive, an optical disc, and the like. As described in detail below, machine-readable storage medium 120 may be encoded with executable instructions for randomized heap allocation. As detailed below, storage medium 120 may maintain and/or store the data and information described herein.

Heap creation instructions 121, when executed by processor 110, may create a set of heaps for an application. The heap creation instructions 121, when executed by processor 110, may create the set of heaps responsive to an instance of the application being instantiated. As such, each instance of an application may have its own corresponding set of heaps. The heap creation instructions 121, when executed by processor 110, may create the set of heaps in a non-transitory storage medium (e.g, medium 120) accessible to the application. The application may be, for example, any application executing on a server in the system 100. In some examples, the application may be a cloud-based application, with an instance of the application being executed on the server in the system 100.

The heap creation instructions 121, when executed by processor 110, may create the set of heaps for the application by creating a random number of heaps for the application. In some examples, the heap creation instructions 121, when executed by processor 110, may determine the random number of heaps to create within a predetermined number range associated with the application. In some examples, the heap creation instructions 121, when executed by processor 110, may create the set of heaps for the application by creating a predetermined number of heaps for the application based on a number of object types used by the application, based on an average amount of heap management calls (e.g., heap allocation calls, heap free calls, and/or other heap management calls) performed by the application, a number of instances of the application that are instantiated, any combination thereof, and/or based on other factors. In some examples, a first number of heaps created for a first instance of an application instantiated on the system 100 may be different than a second number of heaps created for a second instance of the application instantiated on the system 100.

In some examples, the heap creation instructions 121, when executed by processor 110, may erase the set of heaps responsive to determining that the application is under attack. In these examples, a new instance of the application may be instantiated responsive to determining that the application has been under attack. In some examples, the heap creation instructions 121, when executed by processor 110, may create a new set of heaps responsive to receiving information from the system that a new instance of the application has been instantiated (e.g., responsive to user request and/or responsive to other functionality being performed where the application has not been under attack).

As mentioned above, the heap creation instructions 121, when executed by processor 110, may create respective sets of heaps for each instance of an application being instantiated. For example, the heap creation instructions 121, when executed by processor 110, may create a first set of heaps for a first application responsive to an instance of the first application being instantiated and may create a second set of heaps for a second application responsive to an instance of the second application being instantiated.

In some examples, array allocation instructions 122, when executed by processor 110, may allocate an array for the application. In some examples, the array allocation instructions 122, when executed by processor 110, may allocate a unique array for each respective set of heaps created for each instance of an application instantiated on system 100. For example, the array allocation instructions 122, when executed by processor 110, may allocate the array responsive to the set of heaps being created. As such, the array allocation instructions 122, when executed by processor 110, may allocate a first array for a first instance of an application being instantiated on the system 100 and may allocate a second array for a second instance of the application being instantiated on the system 100. Similarly, the array allocation instructions 122, when executed by processor 110, may allocate a first array for an instance of a first application being instantiated on the system 100 and may allocate a second array for an instance of a second application being instantiated on the system 100

The array allocation instructions 122, when executed by processor 110, may allocate an array comprise a set of elements and may associate each element of the array with a unique object type of the set of object types of the application. The array allocation instructions 122, when executed by processor 110, may allocate an array in the non-transitory machine-readable storage medium 120. For example, the array allocation instructions 122, when executed by processor 110, may access information related to the set of object types of the application (e.g. from the application, from the machine-readable storage medium 120, and/or from other sources). The array allocation instructions 122, when executed by processor 110, may determine a number of object types in the set of object types and may allocate an array with a number of elements that is equal to or greater than the number of objects. In some examples, the number of elements may be determined based on the number of objects. In some examples, each element of the array may comprise storage for a heap pointer and/or other heap identifier.

The array allocation instructions 122, when executed by processor 110, may associate each element of the array with a unique object type of the set of object types of the application. The array allocation instructions 122, when executed by processor 110, may iterate over the set of object types and, for each object type, may associate a respective element of the array with that object type. In some examples, the number of elements may be less than the number of object types, and an element may be associated with multiple object types. In some examples, the number of elements may be greater than the number of object types and some elements may not be associated with an object type. In some examples, the array allocation instructions 122, when executed by processor 110, may receive information related to a new object type from the application and may associate an element that does not yet have an object type with the new object type.

In some examples, the array allocation instructions 122, when executed by processor 110, may allocate an array in parallel with the set of heaps being created. For example, the array allocation instructions 122, when executed by processor 110, may allocate an array responsive to an instance of the application being instantiated. In this example, the array allocation instructions 122, when executed by processor 110, may allocate the array in situations the same as or similar to those described above that may cause the heap allocation instructions 121, when executed by processor 110, to create a set of heaps.

In some examples, the array initialization instructions 123, when executed by processor 110, may initialize the array. For example, the array initialization instructions 123, when executed by processor 110, may initialize the array responsive to the array being allocated and elements of the array being associated with object types. The array initialization instructions 123, when executed by processor 110, may initialize the array by iterating over the array to associate each element of the array with a randomly chosen heap of the set of heaps. The array initialization instructions 123, when executed by processor 110, may associate an element with a heap by associating the element with a heap pointer of the heap. For example, the array initialization instructions 123, when executed by processor 110, may associate an element with a heap by storing the heap pointer of the heap at the element. The array initialization instructions 123, when executed by processor 110, may also store the associations between the elements and the heaps in the non-transitory machine-readable storage medium 120. In some examples, responsive to the array being initialized, each heap of the set of heaps may be associated with at least one element of the array.

Non-transitory machine-readable storage medium 120 may store information related to the applications instantiated on system 100, the heaps created for each instance of an application, the arrays allocated for each set of heaps, and/or other information related to the heap allocation described herein.

Figure 2:
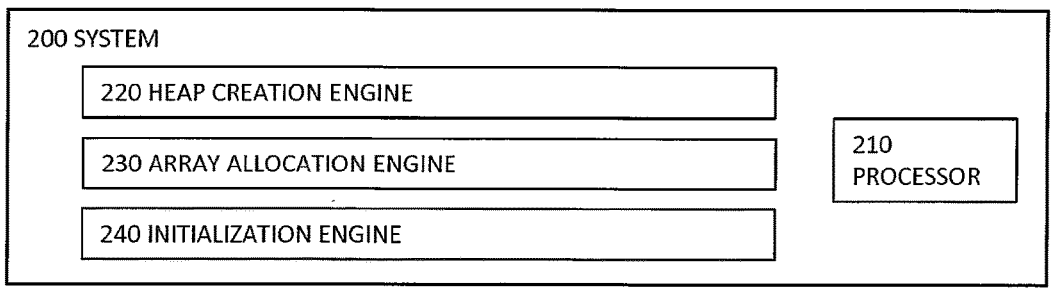
FIG. 2 is a block diagram of an example system for randomized heap allocation.

FIG. 2 is a block diagram of an example system 200 for randomized heap allocation. As with system 100, system 200 may comprise a cloud server, a mainframe, notebook, desktop, tablet, workstation, mobile device, and/or any other device suitable for executing the functionality described below. As with processor 110 of FIG. 1, processor 210 may be one or more CPUs, microprocessors, and/or other hardware devices suitable for retrieval and execution of instructions. The non-transitory machine readable storage of FIG. 2 may be the same or or similar to the storage medium 120 of FIG. 1. Non-transitory machine-readable storage medium of FIG. 2 may store information related to the applications instantiated on system 200, the heaps created for each instance of an application, the arrays allocated for each set of heaps, and/or other information related to the heap allocation described herein. In some examples, the information stored by non-transitory machine-readable storage medium may be the same as or similar to information stored by non-transitory machine-readable storage medium 120

As detailed below, system 200 may include a series of engines 220-240 for randomized heap allocation. Each of the engines may generally represent any combination of hardware and programming. For example, the programming for the engines may be processor executable instructions stored on a non-transitory machine-readable storage medium and the hardware for the engines may include at least one processor of the system 200 to execute those instructions. In addition or as an alternative, each engine may include one or more hardware devices including electronic circuitry for implementing the functionality described below.

Heap creation engine 220 may create, in the non-transitory machine-readable storage medium of system 200, a set of heaps for an application. The heap creation engine 220 may create the set of heaps responsive to instantiating the application. The heap creation engine 220 may create a respective set of heaps for each instantiation of an application at system 200. In some examples, the heap creation engine 220 may create the set of heaps in a manner the same as or similar to that of the heap creation instructions 122 of system 100. Further details regarding an example implementation of heap creation engine 220 are provided above in connection with heap creation instructions 121 of FIG. 1.

Array allocation engine 230 may allocate, in the storage medium of system 200, an array for the application, where the application may comprise a set of object types and the array may comprise a set of elements. The array allocation engine 230 may also associate each element of the array with a unique object type of the set of object types. In some examples, the array allocation engine 230 may allocate the array for the application and associate each element of the array with a unique object type of the set of object types in a manner the same as or similar to that of the array allocation instructions 122 of system 100. Further details regarding an example implementation of array allocation engine 230 are provided above in connection with array allocation instructions 122 of FIG. 1.

Initialization engine 240 may iterate over the array to associate each element of the array with a heap pointer of a randomly chosen heap of the set of heaps. In some examples, the initialization engine 240 may iterate over the array to associate each element of the array with a heap pointer of a randomly chosen heap in a manner the same as or similar to that of the system 100. Further details regarding an example implementation of initialization engine 240 are provided above in connection with array initialization instructions 123 of FIG. 1.

Figure 3:
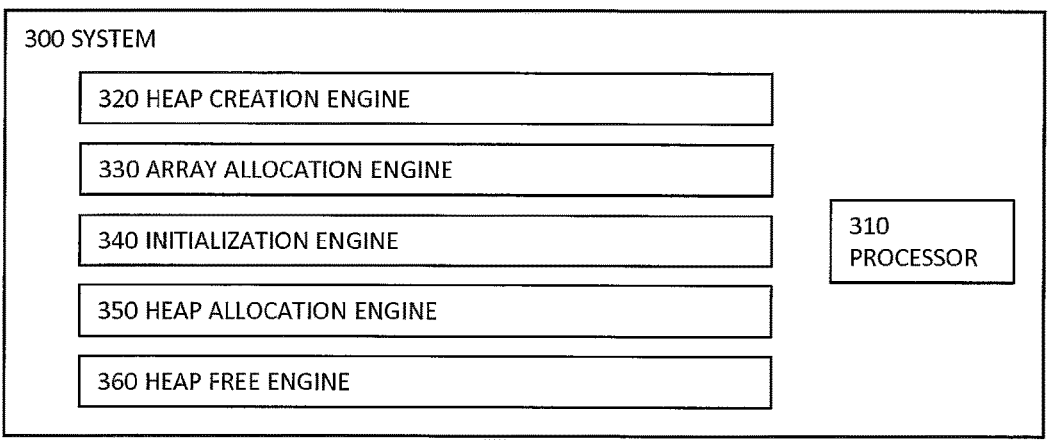
FIG. 3 is a block diagram of an example system for randomized heap allocation.

FIG. 3 is a block diagram of an example system for randomized heap allocation. As illustrated in FIG. 3 and described below, system 300 may comprise a processor 310, a non-transitory machine readable storage medium, a series of engines 320-360 for randomized heap allocation, and/or other components.

As with processor 110 of FIG. 1, processor 310 may be one or more CPUs, microprocessors, and/or other hardware devices suitable for retrieval and execution of instructions. As with machine-readable storage medium 120, non-transitory machine-readable storage medium may be any hardware storage device for maintaining data accessible to system 300. As with engines 220-240, engines 330-350 may generally represent any combination of hardware and programming.

Non-transitory machine-readable storage medium of FIG. 3 may store information related to the applications instantiated on system 300, the heaps created for each instance of an application, the arrays allocated for each set of heaps, and/or other information related to the heap allocation described herein. In some examples, the information stored by non-transitory machine-readable storage medium of FIG. 3 may be the same as or similar to information stored by non-transitory machine-readable storage medium 120.

Heap creation engine 320 may perform functionality the same as or similar to that of the heap creation engine 220 of system 200. Further details regarding an example implementation of heap creation engine 320 are provided above in connection with heap creation engine 220 of system 200.

Array allocation engine 330 may perform functionality the same as or similar to that of the array allocation engine 230 of FIG. 2. Further details regarding an example implementation of array allocation engine 330 are provided above in connection with array allocation engine 230 of FIG. 2.

Initialization engine 340 may perform functionality the same as or similar to that of the initialization engine 240 of FIG. 2. Further details regarding an example implementation of initialization engine 340 are provided above in connection with initialization engine 240 of FIG. 2.

Heap allocation engine 350 may perform heap functionality for the system 300. For example, heap allocation engine 350 may perform heap calls using the set of heaps and allocated arrays of the heap creation engine 320, array allocation engine 330, initialization engine 340, and/or other components of system 300. Heap allocation engine 350 may perform heap functionality by, for example, performing heap allocation functionality, and/or other functionality related to managing data in the application via the set of heaps.

Heap allocation engine 350 may perform heap allocation functionality by determining that an object is to be allocated, retrieving information related to a corresponding heap from the array based on an object type of the object being allocated, and including the retrieved information in a heap allocation call for the object. Heap allocation engine 350 may determine that an object is to be allocated responsive to receiving information from the application that an object is to be allocated. The information may comprise, for example, the object type, an object size, and/or other information related to the object to be allocated. The heap allocation engine 350 may retrieve information related to a corresponding heap from the array based on the object type by determining which array element is associated with the object type of the object to be allocated. The heap allocation engine 350 may include information related to the corresponding heap in a heap allocation call and may perform the heap allocation call and/or send the heap allocation call to the application to be performed.

Heap free engine 360 may perform heap functionality for the system 300. For example, heap allocation engine 250 may perform heap calls using the set of heaps and allocated arrays of the heap creation engine 320, array allocation engine 330, initialization engine 340, and/or other components of system 300. Heap free engine 360 may perform heap functionality by, for example, performing heap free functionality, and/or other functionality related to managing data in the application via the set of heaps.

Heap free engine 360 may perform heap free functionality by determining that an object is to be freed, retrieving information related to a corresponding heap from the array based on an object type of the object being freed, and including the retrieved information in a heap free call for the object. Heap free engine 360 may determine that an object is to be freed responsive to receiving information from the application that the object is to be freed. The information may comprise, for example, an object identifier, the object type, an object size, and/or other information related to the object to be freed. The heap free engine 360 may retrieve information related to a corresponding heap from the array based on the object type by determining which array element is associated with the object type of the object to be freed. The heap free engine 360 may include information related to the corresponding heap in a heap free call and may perform the heap free call and/or send the heap free call to the application to be performed.

System 300 may perform other functionality related to heap management for the application as well and is not limited to the examples of heap management functionality described herein.

Figure 4:
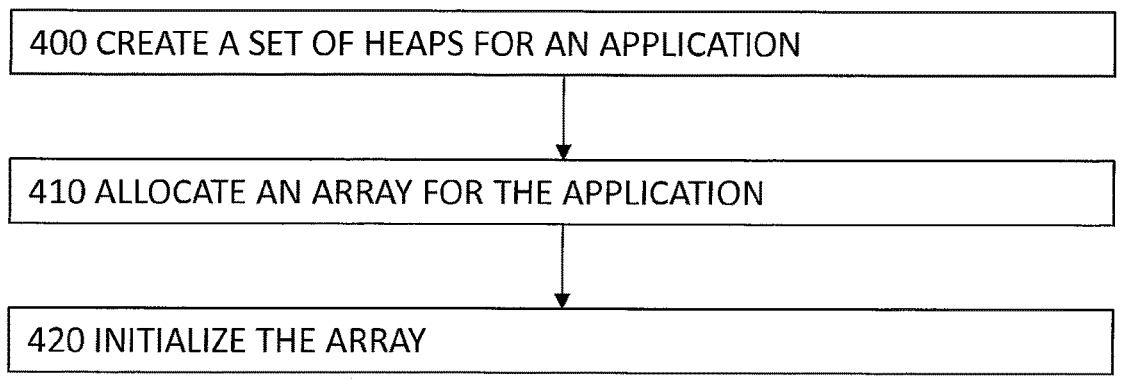
FIG. 4 is a flowchart of an example method for randomized heap allocation.

FIG. 4 is a flowchart of an example method for execution by a computing device for randomized heap allocation.

Although execution of the methods described below are with reference to system 100 of FIG. 1 system 200 of FIG. 2, and/or system 300 of FIG. 3, other suitable devices for execution of this method will be apparent to those of skill in the art. The method described in FIG. 4 and other figures may be implemented in the form of executable instructions stored on a machine-readable storage medium, such as storage medium 120, by one or more engines described herein, and/or in the form of electronic circuitry.

In an operation 400, a set of heaps may be created for an application responsive to instantiating the application. For example, the system 100 (and/or the heap creation instructions 121, the heap creation engine 220, or other resource of the system 100) may create the set of heaps for the application. The system 100 may create the set of heaps to perform a manner similar or the same as that described above in relation to the execution of the heap creation instructions 121, the heap creation engine 220, and/or other resource of the system 100.

In an operation 410, an array may be allocated for the application, where each element of the array is associated with a unique object type of a set of object types of the application. For example, the system 100 (and/or the array allocation instructions 122, array allocation engine 230, or other resource of the system 100) may allocate the array for the application. The system 100 may allocate the array for the application in a manner similar or the same as that described above in relation to the execution of the array allocation instructions 122, array allocation engine 230 of the system 100.

In an operation 420, the array may be initialized. For example, the system 100 (and/or the array initialization instructions 123, the initialization engine 240, or other resource of the system 100) may initialize the array. The system 100 may initialize the array in a manner similar or the same as that described above in relation to the execution of the array initialization instructions 123, the initialization engine 240, or other resource of the system 100.

Figure 4A:
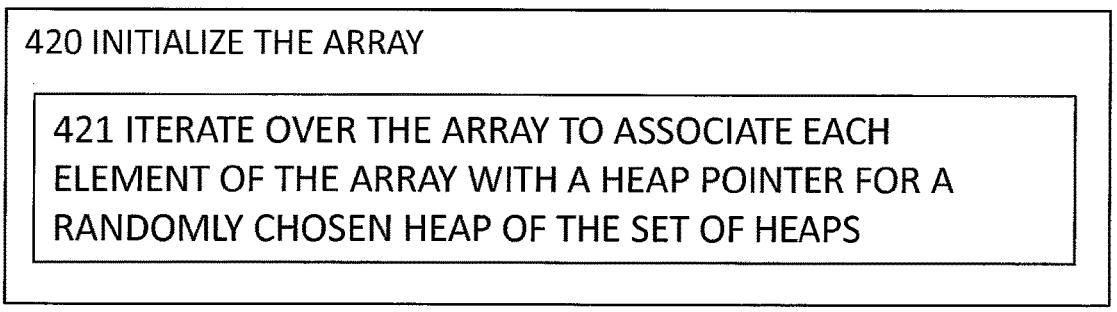
FIG. 4A is a flowchart of an example method for array initialization.

In some examples, the array may be initialized in various manners. FIG. 4A is a flowchart of an example method for execution by a computing device for initializing the array.

In an operation 421, the array may be iterated over to associate each element of the array with a heap pointer for a randomly chosen heap of the created set of heaps. For example, the system 100 (and/or the array allocation instructions 122, array allocation engine 230, or other resource of the system 100) may iterate over the array, associating each element of the array with a heap pointer for a randomly chosen heap of the created set of heaps. The system 100 may iterate over the array, associating each element of the array with a heap pointer for a randomly chosen heap of the created set of heaps in a manner similar or the same as that described above in relation to the execution of the array allocation instructions 122, array allocation engine 230 of the system 100.

The foregoing disclosure describes a number of example embodiments for randomized heap allocation. The disclosed examples may include systems, devices, computer-readable storage media, and methods for randomized heap allocation. For purposes of explanation, certain examples are described with reference to the components illustrated in FIGS. 1-4A. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Further, the sequence of operations described in connection with FIGS. 1-4A are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples.

All such modifications and variations are intended to be included within the scope of this disclosure and protected by the following claims.

We claim:

1. A non-transitory machine-readable storage medium comprising instructions for randomized heap allocation, the instructions executable by a processor of a computing device to:
   create a set of heaps for an application;
   allocate an array for the application, wherein the application comprises a set of object types, the array comprises a set of elements, and each element of the array is associated with a unique object type of the set of object types;
   initialize the array by: iterating over the array to associate each element of the array with a randomly chosen heap of the set of heaps;
   perform heap allocation functionality by: retrieving information related to a corresponding heap from the array based on an object type of an object being allocated; and including the retrieved information in a heap allocation call for the object.

2. The storage medium of claim 1, wherein the instructions to create the set of heaps comprise instructions to:
   create a random number of heaps responsive to instantiating an instance of the application.

3. The storage medium of claim 2, wherein the instructions to create the random number of heaps comprise instructions to:
   determine the random number within a predetermined number range associated with the application.

4. The storage medium of claim 1, further comprising instructions executable by the processor to:
   perform heap free functionality by: retrieving information related to a corresponding heap from the array based on an object type of an object being freed; and
   including the retrieved information in a heap free call for the object.

5. A system for randomized heap allocation, the system comprising:
   a heap creation engine that creates, in a non-transitory machine-readable storage medium, a set of heaps for an application responsive to instantiating the application;
   an array allocation engine that: allocates, in the storage medium, an array for the application, the application comprising a set of object types, the array comprising a set of elements, and associates each element of the array with a unique object type of the set of object types;
   an initialization engine that iterates over the array to associate each element of the array with a heap pointer of a randomly chosen heap of the set of heaps; and
   a heap allocation engine that performs heap allocation functionality by: retrieving information related to a corresponding heap from the array based on an object type of an object being allocated, and including the retrieved information in a heap allocation call for the object.

6. The system of claim 5, wherein the heap creation engine creates the set of heaps by creating a random number of heaps responsive to instantiating an instance of the application.

7. The system of claim 5, further comprising:
   a heap free engine that performs heap free functionality by:
   retrieving information related to a corresponding heap from the array based on an object type of an object being freed; and
   including the retrieved information in a heap free call for the object.

8. A method for randomized heap allocation being implemented in a computer system comprising a physical processor and a non-transitory machine-readable storage medium, the method comprising:
   responsive to instantiating an application, creating, by the processor, a set of heaps for the application;
   allocating, by the processor, an array for the application, wherein the application comprises a set of object types, the array comprises a set of elements, and each element of the array is associated with a unique object type of the set of object types;
   initializing, by the processor, the array by: iterating, by the processor, over the array to associate each element of the array with a heap pointer for a randomly chosen heap of the set of heaps, wherein each heap of the set of heaps is associated with at least one element of the array; and
   performing, by the processor, heap allocation functionality by:
   retrieving, by the processor, information related to a corresponding heap from the array based on an object type of an object being allocated; and including, by the processor, the retrieved information in a heap allocation call for the object.

9. A non-transitory machine-readable storage medium comprising instructions for randomized heap allocation, the instructions executable by a processor of a computing device to:
   create a set of heaps for an application;
   allocate an array for the application, wherein the application comprises a set of object types, the array comprises a set of elements, and each element of the array is associated with a unique object type of the set of object types;
   initialize the array by: iterating over the array to associate each element of the array with a randomly chosen heap of the set of heaps;
   responsive to determining that a new instance of the application has been instantiated: create a new set of heaps for the application; allocate a new array and initialize the new array; and
   instantiate the new instance of the application responsive to determining that the application has been under attack.

10. A system for randomized heap allocation, the system comprising:
    a heap creation engine that creates, in a non-transitory machine-readable storage medium, a set of heaps for an application responsive to instantiating the application;
    an array allocation engine that: allocates, in the storage medium, an array for the application, the application comprising a set of object types, the array comprising a set of elements, and associates each element of the array with a unique object type of the set of object types; and
    an initialization engine that iterates over the array to associate each element of the array with a heap pointer of a randomly chosen heap of the set of heaps;
    wherein the heap creation engine creates a second set of heaps for a second application responsive to instantiating the second application; the array allocation engine: allocates second array for the second application, the second application comprising a second set of object types, the second array comprising a second set of elements, and associates each element of the second array with a unique object type of the second set of object types; and the initialization engine iterates over the second array to associate each element of the second array with a heap pointer of a randomly chosen heap of the second set of heaps.

11. A method for randomized heap allocation being implemented in a computer system comprising a physical processor and a non-transitory machine-readable storage medium, the method comprising:

responsive to instantiating an application, creating, by the processor, a set of heaps for the application;

allocating, by the processor, an array for the application, wherein the application comprises a set of object types, the array comprises a set of elements, and each element of the array is associated with a unique object type of the set of object types;

initializing, by the processor, the array by: iterating, by the processor, over the array to associate each element of the array with a heap pointer for a randomly chosen heap of the set of heaps, wherein each heap of the set of heaps is associated with at least one element of the array; and performing, by the processor, heap free functionality by: retrieving, by the processor, information related to a corresponding heap from the array based on an object type of an object being freed; and including, by the processor, the retrieved information in a heap free call for the object.

* * * * *

UNITED STATES PATENT AND TRADEMARK OFFICE
CERTIFICATE OF CORRECTION

PATENT NO. : 10,528,737 B2
APPLICATION NO. : 15/834588
DATED : January 7, 2020
INVENTOR(S) : Zuckerbraun et al.

Page 1 of 1

It is certified that error appears in the above-identified patent and that said Letters Patent is hereby corrected as shown below:

In the Claims

Claim 1, Column 9, Line 19, after "of the set of heaps;" insert -- and --

Signed and Sealed this
Twenty-fourth Day of March, 2020

Andrei Iancu
*Director of the United States Patent and Trademark Office*